US010277352B2

(12) United States Patent
Chedore et al.

(10) Patent No.: US 10,277,352 B2
(45) Date of Patent: Apr. 30, 2019

(54) NOISE SUPPRESSION AND AMPLIFICATION SYSTEMS AND METHODS FOR COLORLESS OPTICAL ADD/DROP DEVICES

(71) Applicant: Ciena Corporation, Hanover, MD (US)

(72) Inventors: Paul Chedore, Ottawa (CA); Jean-Luc Archambault, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 15/162,954

(22) Filed: May 24, 2016

(65) Prior Publication Data

US 2017/0346591 A1 Nov. 30, 2017

(51) Int. Cl.
*H04B 10/2507* (2013.01)
*H04J 14/02* (2006.01)
*H04Q 11/00* (2006.01)
*H04B 10/2525* (2013.01)

(52) U.S. Cl.
CPC ...... *H04J 14/0212* (2013.01); *H04Q 11/0005* (2013.01); *H04B 10/2507* (2013.01); *H04B 10/25253* (2013.01); *H04Q 2011/0009* (2013.01); *H04Q 2011/0016* (2013.01); *H04Q 2011/0049* (2013.01)

(58) Field of Classification Search
None
See application file for complete search history.

(56) References Cited

U.S. PATENT DOCUMENTS

| 5,905,745 | A | 5/1999 | Grubb et al. |
| 6,281,997 | B1 | 8/2001 | Alexander et al. |
| 6,407,863 | B1 | 6/2002 | Archambault et al. |
| 6,459,516 | B1 | 10/2002 | Mizrahi et al. |
| 6,567,196 | B1 | 5/2003 | Archambault |
| 7,054,562 | B1 * | 5/2006 | Balakrishnan ... H04B 10/25073 398/82 |

(Continued)

FOREIGN PATENT DOCUMENTS

WO 00/63728 10/2000

OTHER PUBLICATIONS

Finisar, Programmable narrow-band filtering using the WaveShaper 1000S and WaveShaper 4000S, 2012, Finisar, pp. 1-5.*

(Continued)

*Primary Examiner* — Kenneth N Vanderpuye
*Assistant Examiner* — Jai M Lee
(74) *Attorney, Agent, or Firm* — Clements Bernard Walker PLLC; Christopher L. Bernard; Lawrence A. Baratta, Jr.

(57) ABSTRACT

A method for noise suppression in a colorless optical add/drop system implemented prior to a colorless optical add/drop device includes, subsequent to receiving an optical signal from an optical modem, filtering the optical signal with a wavelength blocking filter to suppress out of band Amplified Stimulated Emission (ASE) in order to prevent noise funneling in the colorless optical add/drop device; and providing the filtered optical signal with the out of band ASE suppressed therein to a multiplexer port in the colorless optical add/drop device. The method can include, prior to the filtering, amplifying the optical signal with a single channel amplifier, wherein the single channel amplifier can include a pump laser shared with one or more additional single channel amplifiers.

18 Claims, 16 Drawing Sheets

(56) References Cited

U.S. PATENT DOCUMENTS

| | | | |
|---|---|---|---|
| 7,231,107 B1 | 6/2007 | Zhong et al. | |
| 7,254,327 B1* | 8/2007 | Zhong | H04B 10/0775 398/33 |
| 7,693,357 B2 | 4/2010 | El Fellah et al. | |
| 8,457,497 B2 | 6/2013 | Zhong et al. | |
| 8,625,994 B2* | 1/2014 | Archambault | H04J 14/0206 398/43 |
| 8,774,632 B2 | 7/2014 | Archambault | |
| 8,873,905 B2 | 10/2014 | Wu et al. | |
| 2002/0093707 A1* | 7/2002 | Katagiri | H04J 14/0206 398/85 |
| 2003/0090757 A1* | 5/2003 | Ohtani | H04B 10/2916 398/36 |
| 2004/0028319 A1* | 2/2004 | Ajgaonkar | G02B 6/29376 385/16 |
| 2004/0179840 A1* | 9/2004 | Kai | H04J 14/0204 398/33 |
| 2004/0190904 A1* | 9/2004 | Noguchi | H04J 14/0206 398/85 |
| 2005/0226621 A1* | 10/2005 | Kikuchi | H04J 14/021 398/83 |
| 2006/0018660 A1* | 1/2006 | Tian | H04J 14/02 398/85 |
| 2010/0098409 A1* | 4/2010 | Saito | H04Q 11/0062 398/16 |
| 2010/0129082 A1* | 5/2010 | Zhong | H04J 14/0204 398/83 |
| 2010/0202777 A1* | 8/2010 | Liu | H04J 14/0204 398/83 |
| 2010/0239246 A1* | 9/2010 | Taylor | H04B 10/572 398/34 |
| 2012/0106951 A1* | 5/2012 | Wan | H04B 10/0775 398/26 |
| 2013/0121691 A1* | 5/2013 | Od | H04J 14/0221 398/34 |
| 2013/0129350 A1* | 5/2013 | Koley | H04L 41/5022 398/45 |
| 2013/0259490 A1* | 10/2013 | Malouin | H04B 10/6166 398/152 |
| 2013/0308951 A1* | 11/2013 | Blumenthal | H04J 14/02 398/83 |
| 2014/0193156 A1* | 7/2014 | Cavaliere | H04J 14/0201 398/83 |
| 2014/0255026 A1 | 9/2014 | Roorda et al. | |
| 2014/0314415 A1* | 10/2014 | Vassilieva | H04J 14/0227 398/76 |
| 2015/0188276 A1* | 7/2015 | Mitchell | H04J 14/0201 359/337.21 |
| 2015/0208146 A1* | 7/2015 | Younce | H04Q 11/0066 398/21 |
| 2016/0261343 A1* | 9/2016 | Akasaka | H04B 10/25073 |

OTHER PUBLICATIONS

Michel, Stephanie, Which optical modulation schenme best fits my application, 2013, www.lightwaveonline.com/articles/print/volume-30/issue-5/features/which-optical-modulation-scheme-best-fits-my-application.htm.*

Kaminow et al., Optical Fiber Telecommunications V A: Components and Subsystems, 2008, Elsevier, pp. 271-273.*

* cited by examiner

NOISE SUPPRESSION AND AMPLIFICATION SYSTEMS AND METHODS FOR COLORLESS OPTICAL ADD/DROP DEVICES

FIELD OF THE DISCLOSURE

The present disclosure generally relates to optical networking systems and methods. More particularly, the present disclosure relates to noise suppression and amplification systems and methods for colorless optical add/drop devices.

BACKGROUND OF THE DISCLOSURE

Optical networking (Dense Wavelength Division Multiplexing (DWDM) and the like) is driving for a continuous reduction in cost per bit along with increased capacity leading to a curve towards increasingly complex higher order modulation formats. These higher order modulation formats bring two related challenges, namely, 1) significantly higher Received Optical Signal-to-Noise Ratio (ROSNR) requirements and 2) modulation losses leading to transmit lower powers. Concurrently, flexibility in add/drop requirements has led to so-called colorless, directionless, and optionally contentionless add/drop multiplexer structures, such as in Reconfigurable Optical Add/Drop Multiplexer (ROADM) devices, nodes, architectures, and structures. A colorless add/drop device supports any wavelength being added on any port of an add/drop device, i.e., ports are not wavelength specific. A directionless add/drop device supports any port being directed to any degree. Finally, a contentionless add/drop device supports multiple instances of the same channel (wavelength) in the same device. A colorless, directionless add/drop device can be referred to as a CD device, and a colorless, directionless, and contentionless add/drop device can be referred to as a CDC device. Today's CD and CDC architectures rely on power combining to multiplex signals.

The above-referenced challenges are at odds with colorless multiplexer structures for CD or CDC devices. Specifically, colorless multiplexer structures that rely on the power combining of multiple signals. While this approach works well with robust modulation formats such as Dual Polarization-Quadrature Phase Shift Keying (DP-QPSK), as modulation formats migrate forward to support rates of 200 Gb/s and above, this approach incurs significant penalties associated with accumulated Amplified Stimulated Emission (ASE) noise. Such penalties can result in worst case ROSNR requirements being crossed with higher order modulation formats before a single span is traversed due to the accumulated ASE noise. Also, the colorless multiplexer structures have an inherently high insertion loss. Without signal amplification prior to combining, power is too low when it reaches the following amplifier. This results in an unworkable noise penalty through the amplifier, again leading to an unworkable OSNR penalty.

Simply put, there is a need for CD and CDC architectures to support higher order modulation formats (e.g., supporting 200 Gb/s and above).

BRIEF SUMMARY OF THE DISCLOSURE

In an exemplary embodiment, a method for noise suppression in a colorless optical add/drop system implemented prior to a colorless optical add/drop device includes, subsequent to receiving an optical signal from an optical modem, filtering the optical signal with a wavelength blocking filter to suppress out of band Amplified Stimulated Emission (ASE) in order to prevent noise funneling in the colorless optical add/drop device; and providing the filtered optical signal with the out of band ASE suppressed therein to an add port in the colorless optical add/drop device. The wavelength blocking filter can be in a filter array disposed in a module, wherein the module can be separate from the optical modem and the colorless optical add/drop device and connected to each via one or more fiber connections, and wherein the filter array can include a plurality of wavelength blocking filters. The method can further include, prior to the filtering, amplifying the optical signal with a single channel amplifier, wherein the single channel amplifier can include a pump laser shared with one or more additional single channel amplifiers.

The wavelength blocking filter can be in a filter array disposed in a module and the single channel amplifier is in an amplifier array in the housing, wherein the module can be separate from the optical modem and the colorless optical add/drop device and connected to each via one or more fiber connections, and wherein the filter array can include a plurality of wavelength blocking filters and the amplifier array can include the single channel amplifier and the one or more additional single channel amplifiers. The wavelength blocking filter can include a flexible bandwidth Liquid Crystal on Silicon (LCOS) filter, Liquid Crystal (LC) filter, and a Digital Light Processing (DLP) filter. The method can further include, prior to the filtering, automatically detecting the optical signal; and performing a search to provision a passband of the wavelength blocking filter. The optical signal can utilize a modulation format supporting 200 Gb/s or more. The optical modem can include a pluggable optical module. The colorless optical add/drop device can utilize power combiners on an add side. The one or more wavelength blocking filters can be configured to adjust the filter based on an adjustable baud rate of the associated optical modem In another exemplary embodiment, an apparatus for noise suppression in a colorless optical add/drop system, wherein the apparatus is located prior to a colorless optical add/drop device, includes a housing including one or more input ports and one or more output ports; and a filter array including one or more wavelength blocking filters each adapted to receive an optical signal from an optical modem connected to an input port, to filter the optical signal to suppress out of band Amplified Stimulated Emission (ASE) in order to prevent noise funneling in the colorless optical add/drop device, and to provide the filtered optical signal with the out of band ASE suppressed therein to an add port in the colorless optical add/drop device via an output port. The housing can be separate from the optical modem and the colorless optical add/drop device and connected to each via one or more fiber connections, and wherein the filter array can include a plurality of wavelength blocking filters.

The apparatus can further include an amplifier array including one or more single channel amplifiers each adapted to amplify the optical signal, wherein the one or more single channel amplifiers can include a pump laser shared between one another and wherein the amplifier array is located between the filter array and the one or more input ports. The one or more wavelength blocking filters each can include a flexible bandwidth Liquid Crystal on Silicon (LCOS) filter, Liquid Crystal (LC) filter, and a Digital Light Processing (DLP) filter. The apparatus can further include circuitry adapted to automatically detect the optical signal, prior to the filter array; and circuitry adapted to perform a search to provision a passband of an associated wavelength blocking filter. The optical signal can include a modulation format supporting 200 Gb/s or more. The optical modem can include a pluggable optical module. The colorless optical add/drop device can utilize power combiners on an add side. The one or more wavelength blocking filters can be configured to adjust the filter based on an adjustable baud rate of the associated optical modem.

In a further exemplary embodiment, a colorless Reconfigurable Optical Add/Drop Multiplexer (ROADM) node with noise suppression prior to a colorless optical add/drop device includes one or more optical add/drop devices optically coupled to wavelength selective components at one or more directions; one or more optical modems; and a noise suppression module including a filter array including one or more wavelength blocking filters each adapted to receive an optical signal from an optical modem connected to an input port, to filter the optical signal to suppress out of band Amplified Stimulated Emission (ASE) in order to prevent noise funneling in a colorless optical add/drop device, and to provide the filtered optical signal with the out of band ASE suppressed therein to an add port in the colorless optical add/drop device via an output port. The noise suppression module can include an amplifier array including one or more single channel amplifiers each adapted to amplify the optical signal, wherein the one or more single channel amplifiers can include a pump laser shared between one another and wherein the amplifier array is located between the filter array and the one or more input ports. The one or more wavelength blocking filters each can include a flexible bandwidth Liquid Crystal on Silicon (LCOS) filter, Liquid Crystal (LC) filter, and a Digital Light Processing (DLP) filter.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
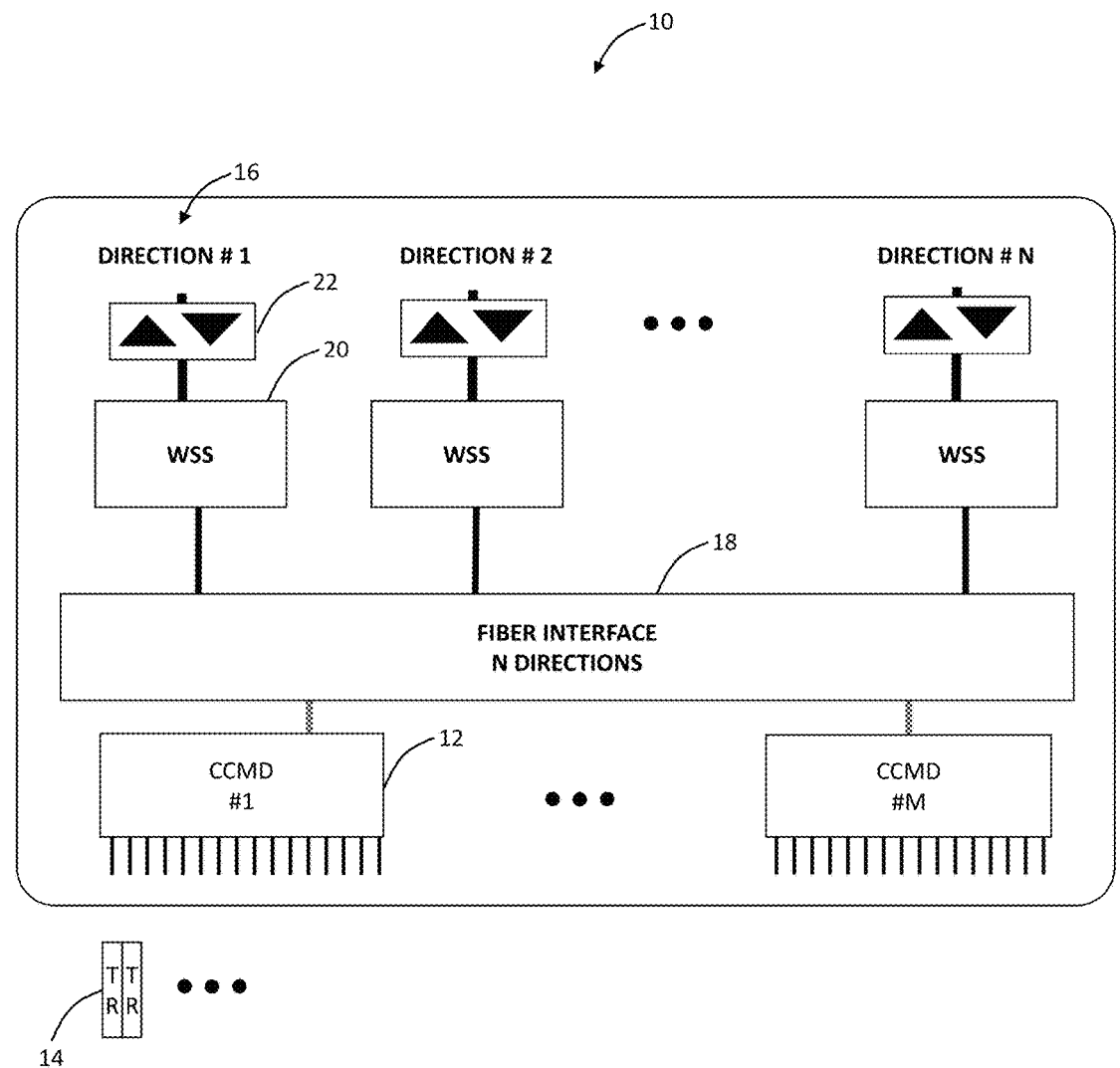
FIG. 1 is a block diagram of an exemplary Reconfigurable Optical Add/Drop Multiplexer (ROADM) node for describing the noise suppression and amplification systems and methods in colorless optical add/drop devices.

Again in various exemplary embodiments, the present disclosure relates to amplification and noise suppression systems and methods for colorless optical add/drop devices. The systems and methods provide various techniques to support complex modulation formats such as with higher order constellations in colorless multiplexer device. Specifically, the systems and methods address two of the main limitations of colorless multiplexer devices, again power combining leading to accumulated ASE and high insertion loss. The systems and methods include noise suppression and/or amplification techniques, associated form factors and product integration, connection validation, and autonomous channel provisioning for the noise suppression. Advantageously, the noise suppression can include filters such as in a blocker array to suppress out of band ASE in order to prevent noise-funneling. The blocker array can include attenuation control to compensate for gain, power, and loss variability. The amplification can be located in the add/drop structure and can include plural individual channel amplifiers through sharing the power of a single pump.

In an exemplary embodiment, the noise suppression and amplification is implemented in the add/drop structure itself, i.e., as part of colorless multiplexer devices or coupled thereto. Of course, other locations are also contemplated for these techniques, including the transponder, transceivers, modems themselves. While, in some instances, it may be possible to address these challenges within the transponder itself; there is also need to tackle these in the add/drop structure for a variety of reasons. First, it is not always feasible or economical to implement noise suppression and/or amplification in pluggable modules which have limited space, power, etc. Second, on card filtering in transponders, transceivers, etc. is limited to fixed bandwidth Gaussian filters. Although these provide valuable noise suppression, they allow a few channel's worth of ASE to leak through. The performance advantage of a blocker based design (with a sharp, flexible bandwidth passband) is significant and advantageous over fixed bandwidth filters, especially in applications with complex modulation formats which require high ROSNR. Also, open DWDM line systems are moving towards disassociating the ROADM architecture from the transponder, transceiver, or modem design. Accordingly, having the noise suppression and amplification in the colorless multiplexer structure allows a mixed population of modems (optical bandwidth, power, filtering, noise sensitivity) to coexist in the same colorless multiplexer structure. This removes a homogeneous population restriction (i.e., each colorless multiplexer structure has to have identical optical modem configuration); thus simplifying things operationally.

Again, the systems and methods render increasingly popular colorless add/drop topologies compatible with noise sensitive rates of 200+ Gb/s. Without the noise suppression, it is not possible to run at these higher rates and achieve any sort of usable reach, due to OSNR. Offering amplification and filtering as part of the colorless add/drop enables the use of lower cost transponder/modem modules. One exemplary application is pluggable modules such as small form factor pluggables. The systems and methods are beneficial in that the cost and space needed to amplify and filter within a pluggable module may be prohibitive. Additionally, the systems and methods advantageously support as open line system feature. The amplification, filtering, equalization and auto-provisioning capability allow operators to connect a mix of modems without concern about power, bandwidth, OSNR, etc.

Reconfigurable Optical Add/Drop Multiplexer (ROADM)

Referring to FIG. 1, in an exemplary embodiment, a block diagram illustrates an exemplary ROADM node 10 for describing the noise suppression and amplification systems and methods in colorless optical add/drop devices 12. The ROADM node 10 includes one or more of the colorless optical add/drop devices 12, e.g., up to M optical add/drop devices 12. The optical add/drop devices 12 can be referred to as Colorless Channel Multiplexer/Demultiplexers (CCMD). The optical add/drop devices 12 generally include power combiners/splitters, optical amplifiers, Multicast Optical Switches (MCS), etc. and are configured to support colorless multiplexing/demultiplexing in the ROADM node 10. Also, the optical add/drop devices 12 can be contentionless as well, supporting more than one instance of a specific channel in the same device 12. The optical add/drop devices 12 are connected to optical modems 14.

Again, the driver for the noise suppression and amplification systems and methods is to support more complex and high ordered modulation formats on the optical modems 14. The optical modems 14 can support various different baud rates through software-programmable modulation formats. The optical modems 14 can support programmable modulation or constellations with both varying phase and/or amplitude. In an exemplary embodiment, the optical modems 14 can support multiple coherent modulation formats such as, for example, i) dual-channel, Dual Polarization (DP) Binary Phase-Shift Keying (BPSK) for 100 G at submarine distances, ii) DP Quadrature Phase-Shift Keying (QPSK) for 100 G at ultra-long haul distances, iii) 16-Quadrature Amplitude Modulation (QAM) for 200 G at metro to regional (600 km) distances), iv) dual-channel 16 QAM for 400 G at metro to regional distances, v) dual-channel 64 QAM for rates in excess of 400 G at various distances. Thus, in an exemplary embodiment, the same modem 14 can support 100 G to 400 G and beyond. With associated Digital Signal Processing (DSP) in the modem 14 hardware, moving from one modulation format to another is completely software-programmable. Additionally, the modem 14 can support various aspects of nonlinear effect mitigation and dispersion compensation (both for chromatic and polarization mode) in the electrical domain, thus eliminating external dispersion compensation devices, filters, etc. Modems 14 can also adapt the forward error correction coding that is used, as another method to trade-off service rate vs. noise tolerance.

The optical add/drop devices 12 enable any one of the optical modems 14 to be added/dropped from any direction 16 (or degree). In an exemplary embodiment, the ROADM node 10 supports up to N directions, N being an integer greater than 0. Each of the optical add/drop devices 12 can support M channels, M being an integer. Those of ordinary skill in the art will recognize various combinations of N and M can be used to provide expansion and flexibility in constructing the ROADM node 10. To accomplish the directionless functionality, the ROADM node 10 includes a fiber interface device 18 which includes cross-connections from each optical add/drop device 12 to a Wavelength Selective Switch (WSS) 20 for each direction 16. The WSSs 20 are also each connected to amplifiers 22 at each ingress/egress point of the directions 16 into the ROADM node 10. The WSS 20 is configured to add/drop portions of the optical spectrum, such as in 6.25 GHz granularity.

Again, higher order modulation formats, i.e., with more complex constellations, require high ROSNR which can be exceeded due to the aforementioned limitations of the optical add/drop devices 12 in the ROADM node 10. As described herein, higher order modulation formats include N-QAM where N is 16 or greater, e.g., 16-QAM, 64-QAM, etc. Thus, in an exemplary embodiment, the systems and methods include techniques implemented at or coupled to the optical add/drop devices 12, as well as implemented prior to, for noise suppression, amplification, connection validation, and autonomous channel provisioning.

Noise Suppression

Figures 2A, 2B:
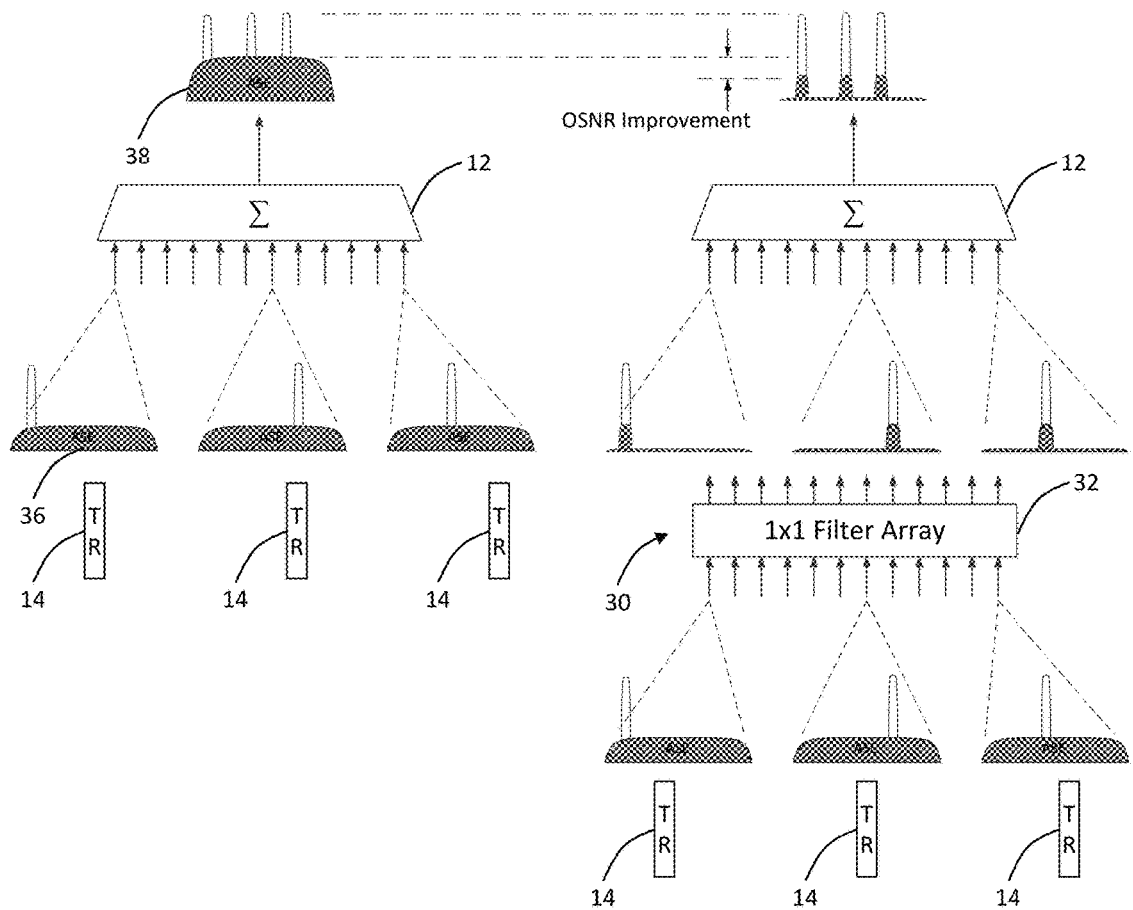
FIG. 2A is a block diagram of channel additions with the optical add/drop device from the ROADM node of FIG. 1 for three exemplary channels along with the associated accumulated ASE before and after the optical add/drop device.
FIG. 2B is a block diagram of the same channel additions as in FIG. 2A with a blocker array including a 1×1 filter array between the modems and the optical add/drop device for noise suppression.
Figures 3A, 3B:
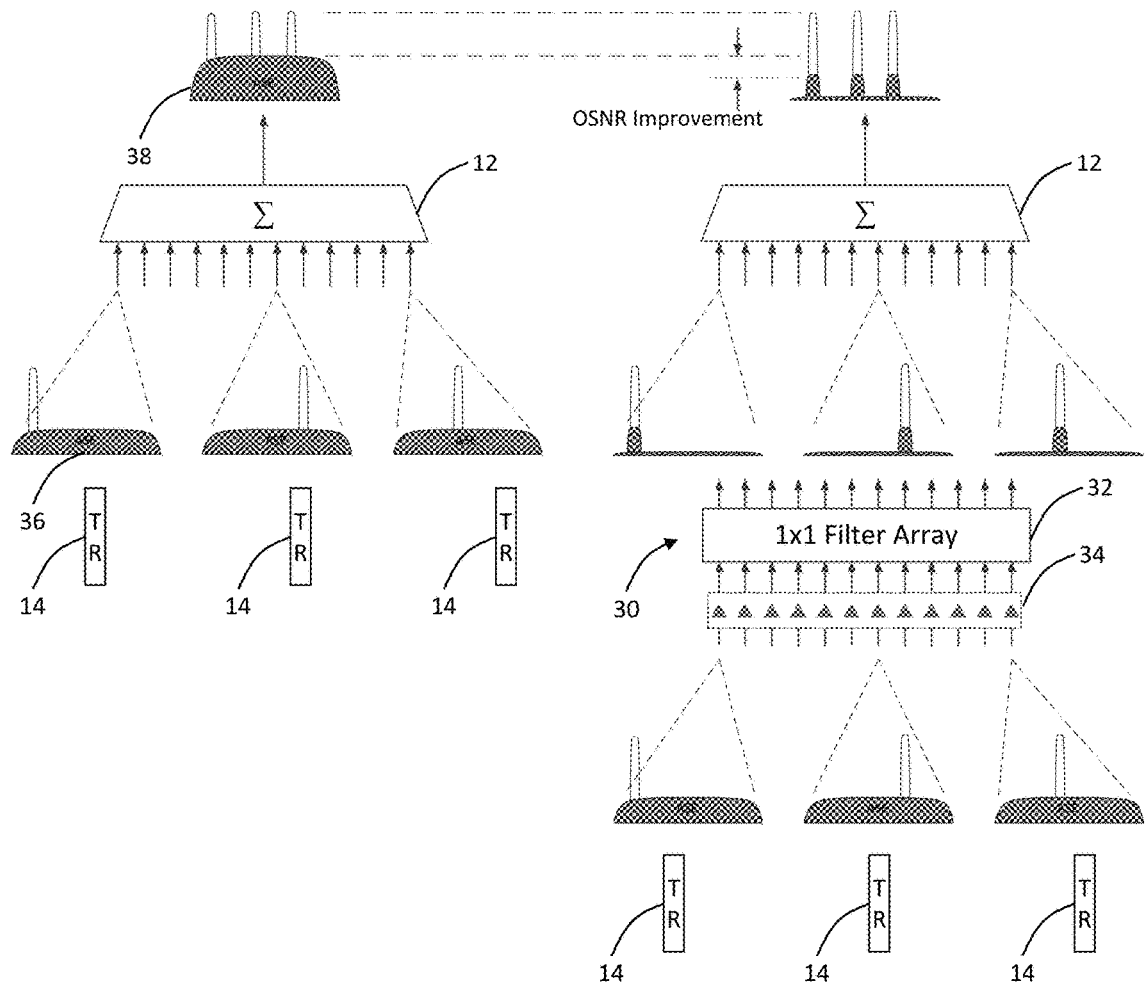
FIG. 3A is a block diagram of channel additions with the optical add/drop device from the ROADM node of FIG. 1 for three exemplary channels along with the associated accumulated ASE before and after the optical add/drop device.
FIG. 3B is a block diagram of the same channel additions as in FIG. 3A with the blocker array including the 1×1 filter array and an amplifier array between the modems and the optical add/drop device for noise suppression and amplification.

Referring to FIGS. 2A, 2B, 3A, and 3B, in an exemplary embodiment, block diagrams illustrate ASE noise accumulation in the optical add/drop devices 12 (FIGS. 2A and 3A) as well as noise suppression via a blocker array 30 (FIGS. 2B and 3B). Specifically, FIGS. 2A and 3B both illustrate identically channel additions with the optical add/drop device 12 for three exemplary channels along with the associated accumulated ASE before and after the optical add/drop device 12. FIG. 2B illustrates the same channel additions as in FIG. 2A with the blocker array 30 including a 1×1 filter array 32 between the modems 14 and the optical add/drop device 12 for noise suppression. FIG. 3B illustrates the same channel additions as in FIG. 3A with the blocker array 30 including the 1×1 filter array 32 and an amplifier array 34 between the modems 14 and the optical add/drop device 12 for noise suppression and amplification.

As shown in FIGS. 2A and 3A, each channel from the modem 14 has associated ASE 36, and the output of a combiner of the optical add/drop device 12 includes combined ASE 38 due to all of the associated ASE 36 from all of the modems 14. As previously described, the combined ASE 38 is problematic and prevents higher order modulation formats due to the ROSNR requirements. Thus, in an exemplary embodiment, the systems and methods include the blocker array 30 located on an input side of the optical add/drop device 12 or coupled to the input side. The filter array 32 includes a 1×1 wavelength blocking filter 40 for each input port into the optical add/drop device 12. The 1×1 wavelength blocking filter can be WSS-based programmable, flexible bandwidth filters that suppress the majority of out of band ASE 36 (as shown in FIGS. 2B and 3B relative to FIGS. 2A and 3A). With the out of band ASE 36 suppressed prior to the optical add/drop device 12, there is little remaining noise added through the optical add/drop device 12, leading to an OSNR improvement again shown in FIGS. 2B and 3B relative to FIGS. 2A and 3A). In FIG. 3B, the blocker array 30 also include the amplifier array 34 in addition to the filter array 32, providing per channel amplification prior to the optical add/drop device 12. Thus, the blocker array 30 is configured to address the two major challenges of CD/CDC structures, noise suppression to overcome ASE and amplification to address insertion loss.

Figure 4:
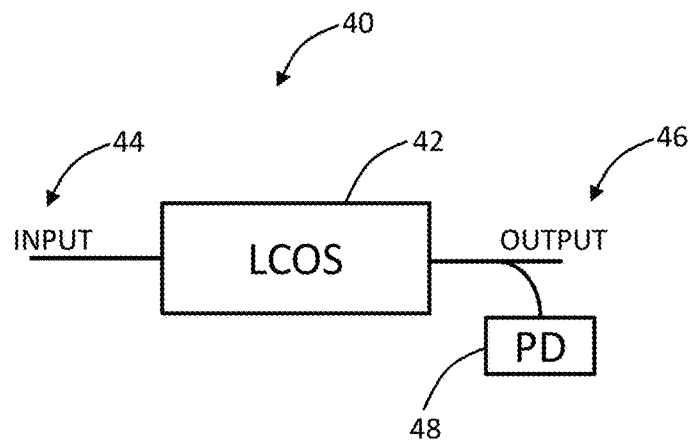
FIG. 4 is a block diagram of a 1×1 wavelength blocking filter for the blocker array in FIGS. 2B and 3B in an exemplary implementation using Liquid Crystal on Silicon (LCOS)
Figure 5:
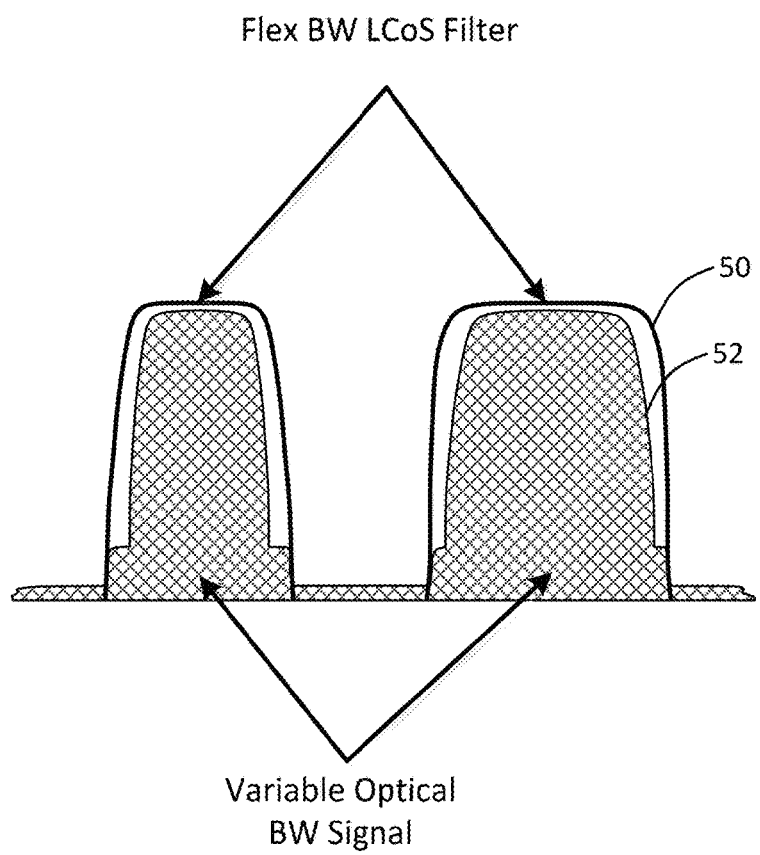
FIG. 5 is a graph of operation of the 1×1 wavelength blocking filter from FIG. 4 with a passband on a variable bandwidth optical signal.

Referring to FIG. 4, in an exemplary embodiment, a block diagram illustrates a 1×1 wavelength blocking filter 40 in an exemplary implementation using Liquid Crystal on Silicon (LCOS) 42. Those of ordinary skill in the art will recognize other technologies are also contemplated instead of LCOS 42, such as, for example a Liquid Crystal (LC) filter, a Digital Light Processing (DLP) filter, and the like. The 1×1 wavelength blocking filter 40 includes an input 44, coupled to the modem 14's transmitter, the LCOS 42 panel, and an output 46 coupled to the optical add/drop device 12. Additionally, the 1×1 wavelength blocking filter 40 includes a detector 48 which is tapped off the output 46 for power monitoring. Referring to FIG. 5, in an exemplary embodiment, a graph illustrates the operation of the 1×1 wavelength blocking filter 40 with a passband 50 on a variable bandwidth optical signal 52. Specifically, the LCOS 42 panel enables a flexible, adjustable passband 50 for different sized optical signals 52, especially advantageous for flexible grid spectrum applications. That is, the 1×1 wavelength blocking filter 40 has the passband 50 specifically tailored for the specific optical signal 52, such as based on feedback from the detector 48. In an exemplary embodiment, the detector 48 can distinguish between the optical signal 52 and the ASE 36 based on power measurements. A simple threshold test can detect the signal 52 versus ASE 36, and is described herein in additional detail relative to the autonomous channel provisioning.

Those of ordinary skill in the art will recognize other technologies are also contemplated instead of the LCOS 42, such as, for example a Liquid Crystal (LC) filter, a Digital Light Processing (DLP) filter, and the like. That is, the LCOS 42 can be any optical filtering technology which can create a flexible filtering bandwidth which is adjustable. For example, the filtering bandwidth can be adjusted to match the bandwidth on the variable bandwidth optical signal 52. This is critical for modems which support variable baud rates and it also distinguishes the wavelength blocking filter 40 from a simple tunable filter. Thus, in various exemplary embodiments, the wavelength blocking filter 40 supports adjustable filtering bandwidth which can be configured based on the adjustable baud rate of a corresponding modem forming the variable bandwidth optical signal 52. The LCOS 42 is a miniaturized reflective active-matrix liquid-crystal display using a liquid crystal layer on top of a silicon backplane and the active-matrix can be controlled to filter the variable bandwidth optical signal 52. DLP utilizes optical Microelectromechanical (MEMS) technology and can similarly be controlled to filter the variable bandwidth optical signal 52. LC is similar to the LCOS 42, without necessarily utilizing the silicon backplane.

Again, having the blocker array 30, the filter array 32, and the 1×1 wavelength blocking filter 40 external from the modem 14 enables an open configuration which can support different types and configurations of the modems 14. It is expected blocker array 30, the filter array 32, and the 1×1 wavelength blocking filter 40 is used with colorless multiplexing devices such as the optical add/drop device 12 when the modems 14 utilize noise sensitive modulation formats, such as 16-QAM, 64-QAM, etc. Further, having the blocker array 30, the filter array 32, and the 1×1 wavelength blocking filter 40 external from the modems 14 allows for an open DWDM line system capable of mixed transponders. The 1×1 wavelength blocking filter 40 supports improved performance over competing techniques within the modem 14 as well as a provisionable passband 50.

Amplification

Figure 6:
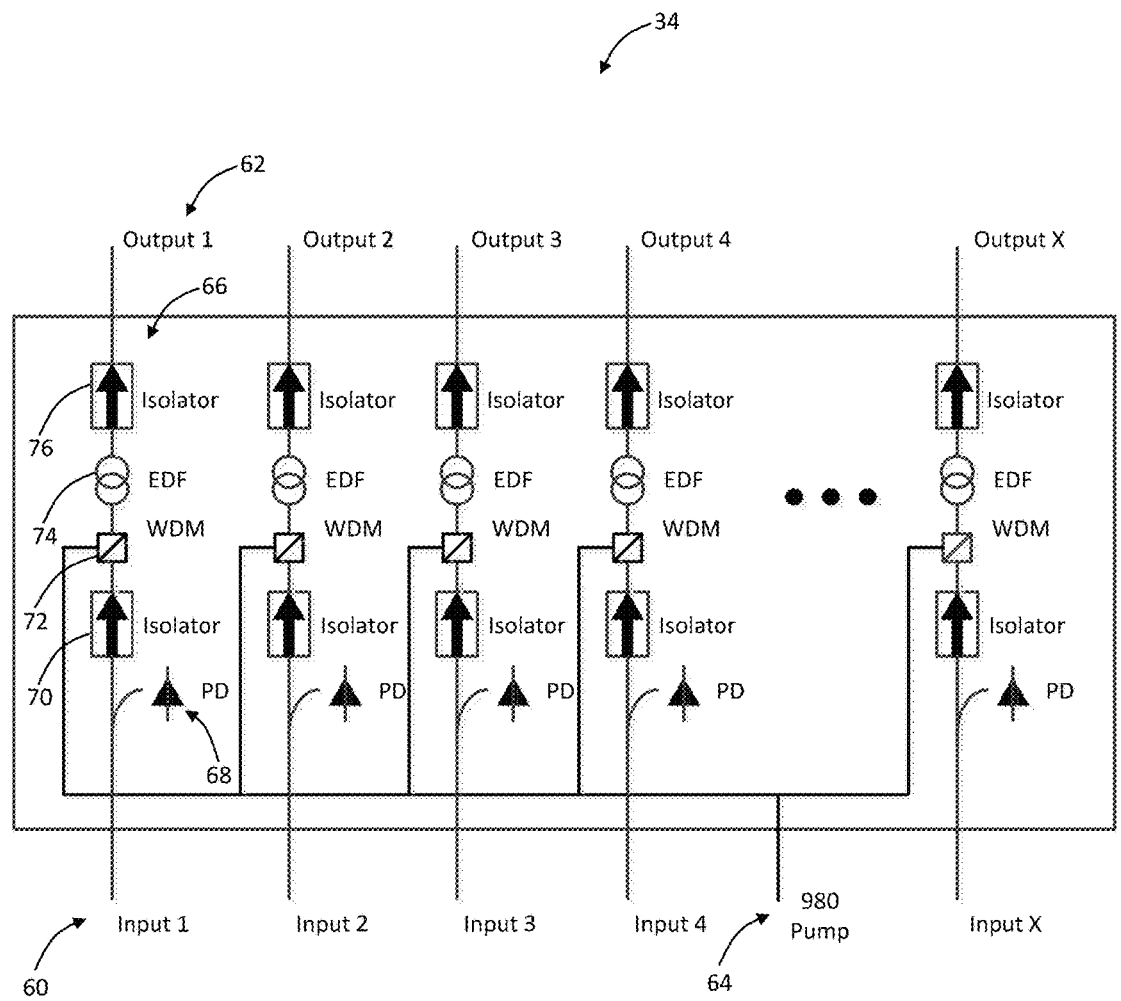
FIG. 6 is a block diagram of an exemplary implementation of the amplifier array, such as in the blocker array.

Referring to FIG. 6, in an exemplary embodiment, a block diagram illustrates an exemplary implementation of the amplifier array 34, such as in the blocker array 30. The amplifier array 34 includes single channel amplification for up to X channels, X being an integer. The amplifier array 34, similar to the filter array 32, can be located between the modems 14 and the input side of the optical add/drop device 12. In an exemplary embodiment, the amplifier array 34 is located between the modems 14 and the filter array 32. The amplifier array 34 includes X inputs 60, one for each of the X channels, coupled to the associated modem 14 and X outputs 62 with components between the inputs 60 and the outputs 62 for per channel amplification. In an exemplary embodiment, a single pump laser 64 (e.g., a 980 nm pump) is shared across the array of single channel amplifiers 66. Each single channel amplifier 66 includes a detector 68 tapped off of the input 60, an isolator 70, a Wavelength Division Multiplexing (WDM) coupler 72 to add the pump laser 64, doped fiber 74 such as Erbium Doped Fiber (EDF), and another isolator 76. The isolators 70, 76 prevent back reflections into the single channel amplifier 66. The doped fiber 74 is the gain medium of the single channel amplifier 66 and is pumped by the pump laser 64. Although the single channel amplifier 66 targets low input power from the modem 14, the single channel amplifier 66 is designed to run at or near saturation such that it also accommodates higher power inputs while maintaining a mostly consistent output power. The pump current can be fixed; thus, there no way to control output power on a per channel basis, and any channel-to-channel imbalance can be addressed in the filter array 32. The tapped detector 68 is configured to detect Loss of Signal (LOS).

Blocker Array Form Factor

Figure 7:
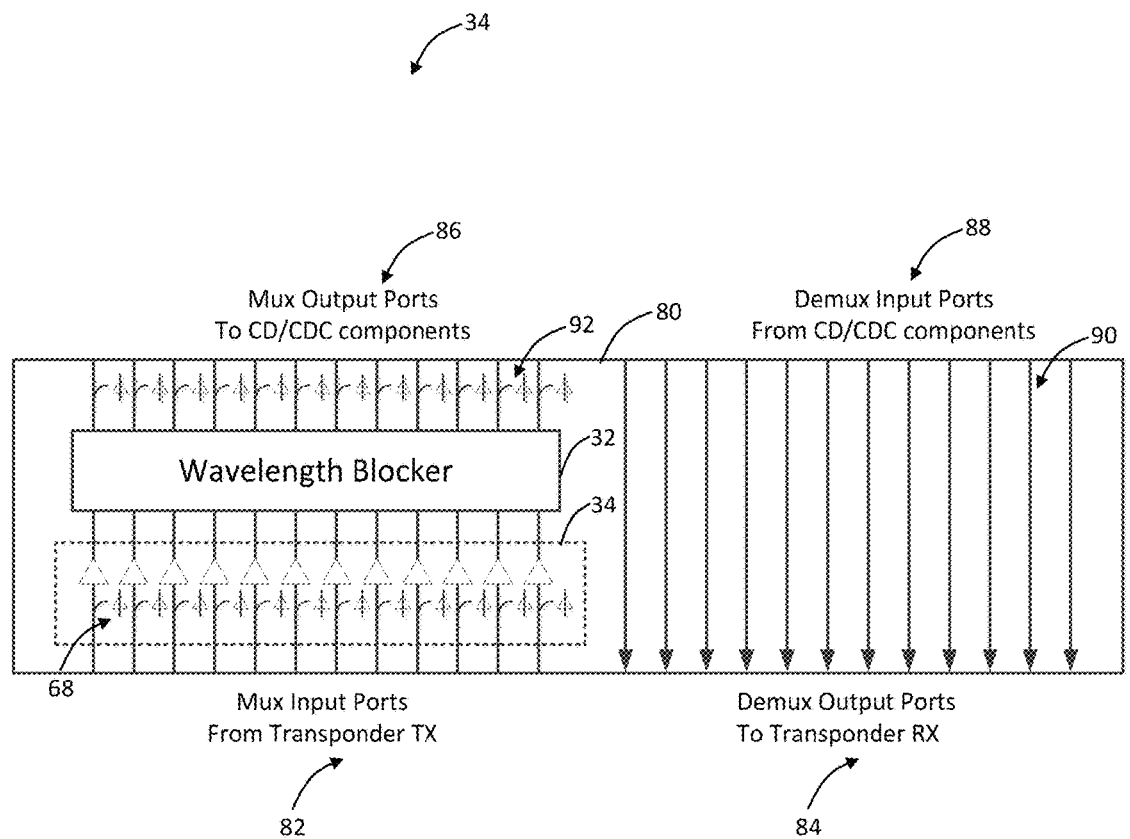
FIG. 7 is a block diagram of an implementation of the blocker array in a module, for operation in the ROADM node of FIG. 1.

Referring to FIG. 7, in an exemplary embodiment, a block diagram illustrates an implementation of the blocker array 30 in a module 80, for operation in the ROADM node 10. The module 80 is a physical housing with multiplexer input ports 82 from the modem 14 transmitters, demultiplexer output ports 84 to the modem 14 receivers, multiplexer output ports 86 to the optical add/drop device 12, i.e., the CD/CDC components, and demultiplexer input ports 88 from the optical add/drop device 12. Specifically, the module 80 can connect to both the add side of the add/drop device 12 via the multiplexer output ports 86 and the drop side of the add/drop device 12 via the demultiplexer input ports 88. The filter array 32 and the amplifier array 34 are only required in the add (multiplexer) path. The drop (demultiplexer) path can be straight through connections 90 from the demultiplexer input ports 88 to the demultiplexer output ports 84. The detectors 68 at the input are required to detect LOS and suppress ASE via the filter array 32 (note, the filter array 32 can be referred to as wavelength blocker, a blocker array, the 1×1 wavelength blocking filters 40, etc.). Output detectors 92 allow for equalization across channels using the filter array's 32 attenuation capability. Without the detectors 92 and equalization across channels using the filter array's 32 attenuation capability, the variation in power due to gain differences, path loss variability, Wavelength Dependent Loss (WDL), etc. leads to an unacceptable channel power disparity. In an exemplary embodiment, similar to FIG. 2B, the module 80 can exclude the amplifier array 34.

Figure 8:
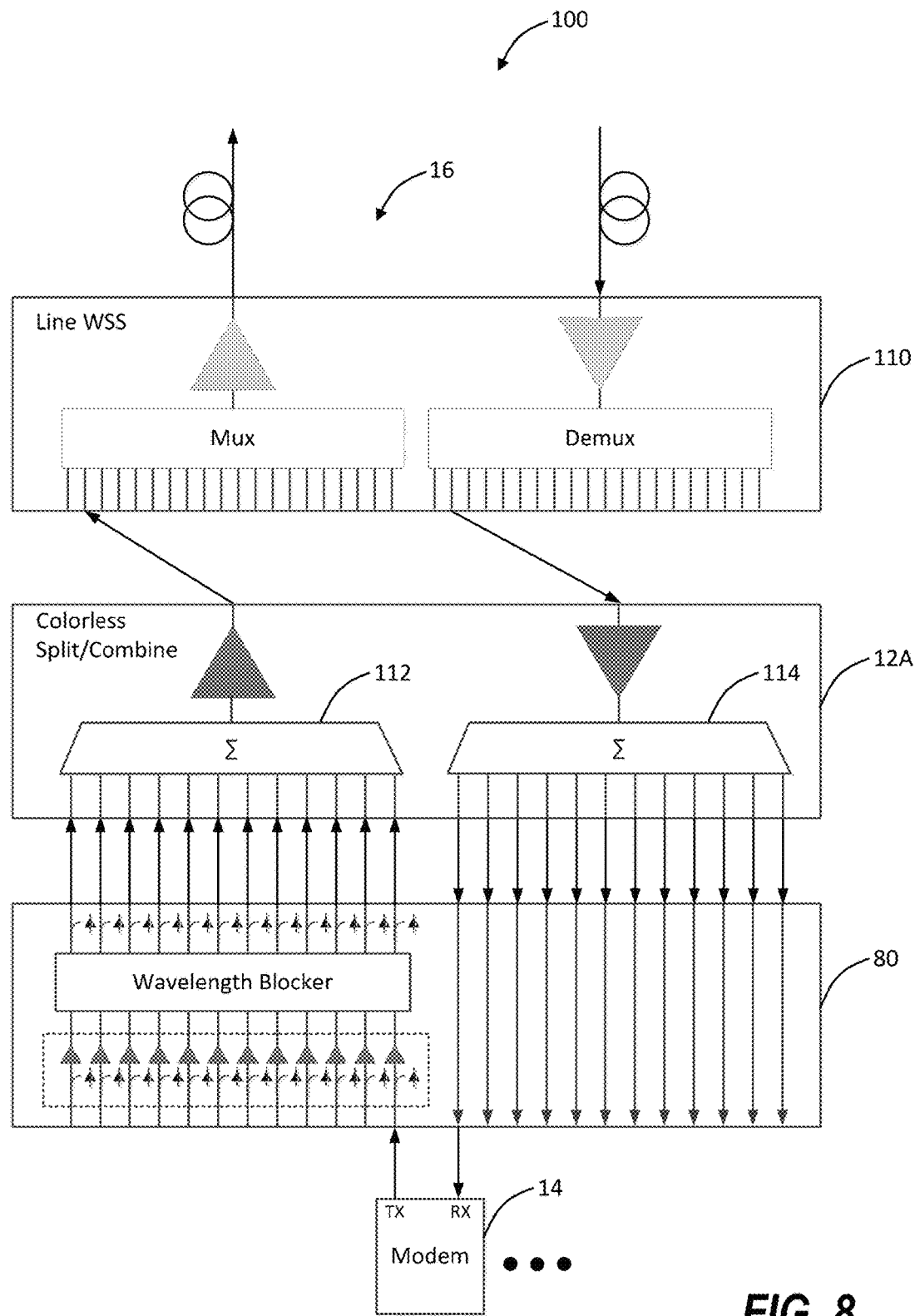
FIG. 8 is a block diagram illustrating the use of the module of FIG. 7 in a colorless ROADM configuration.
Figure 9:
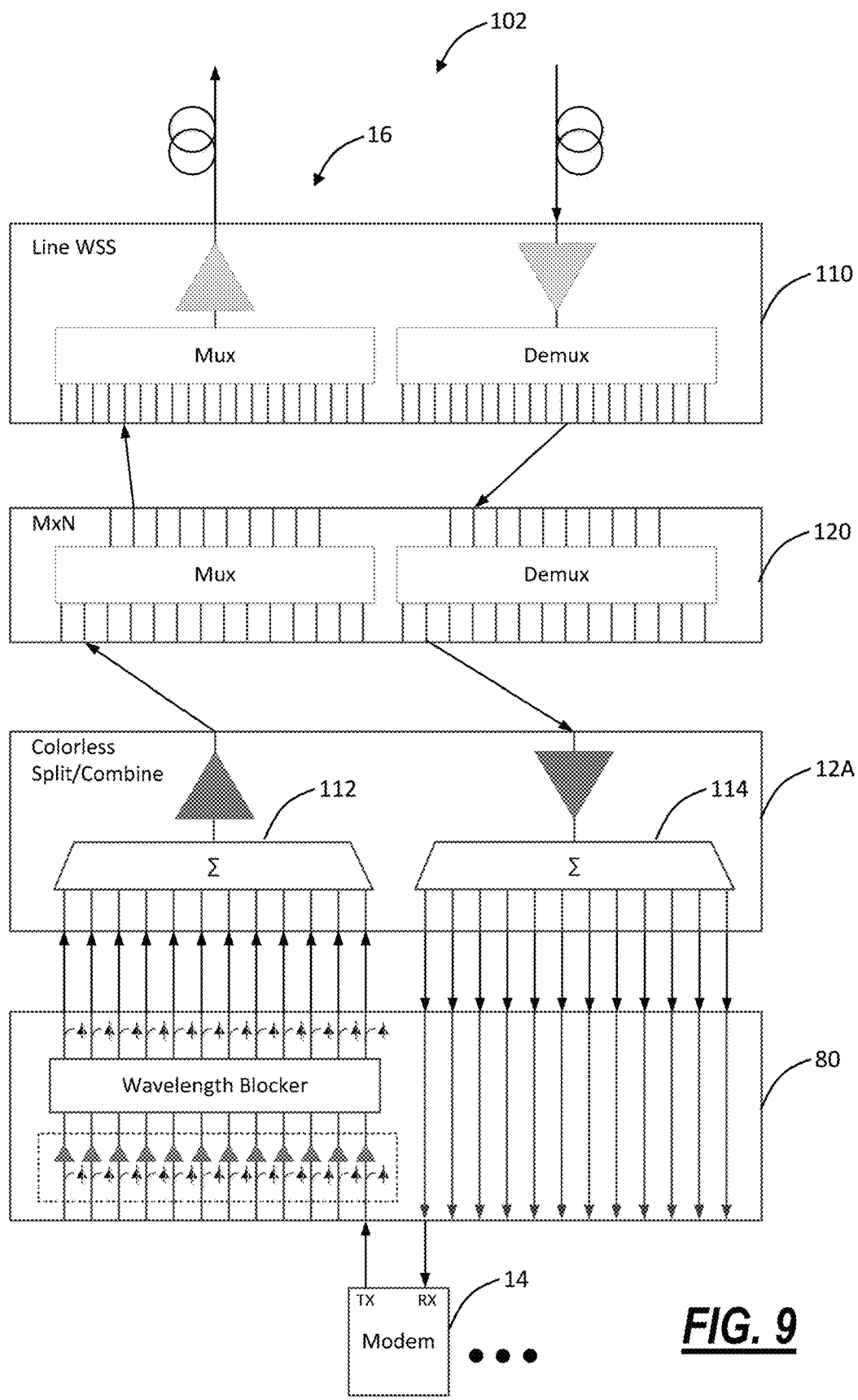
FIG. 9 is a block diagram illustrating the use of the module of FIG. 7 in a colorless and directionless ROADM configuration.
Figure 10:
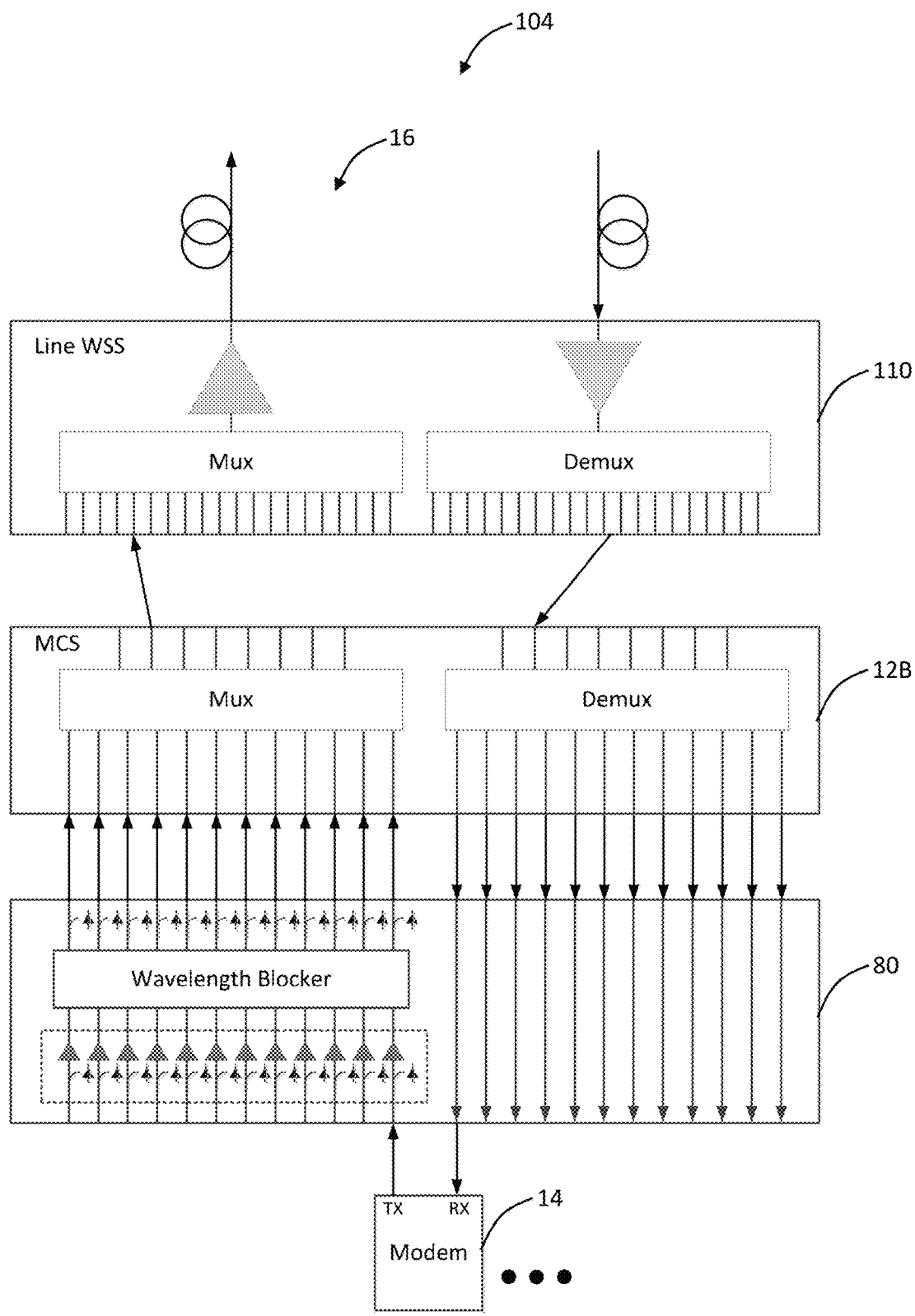
FIG. 10 is a block diagram illustrating the use of the module of FIG. 7 in a colorless, directionless, and contentionless ROADM configuration.
Figure 11:
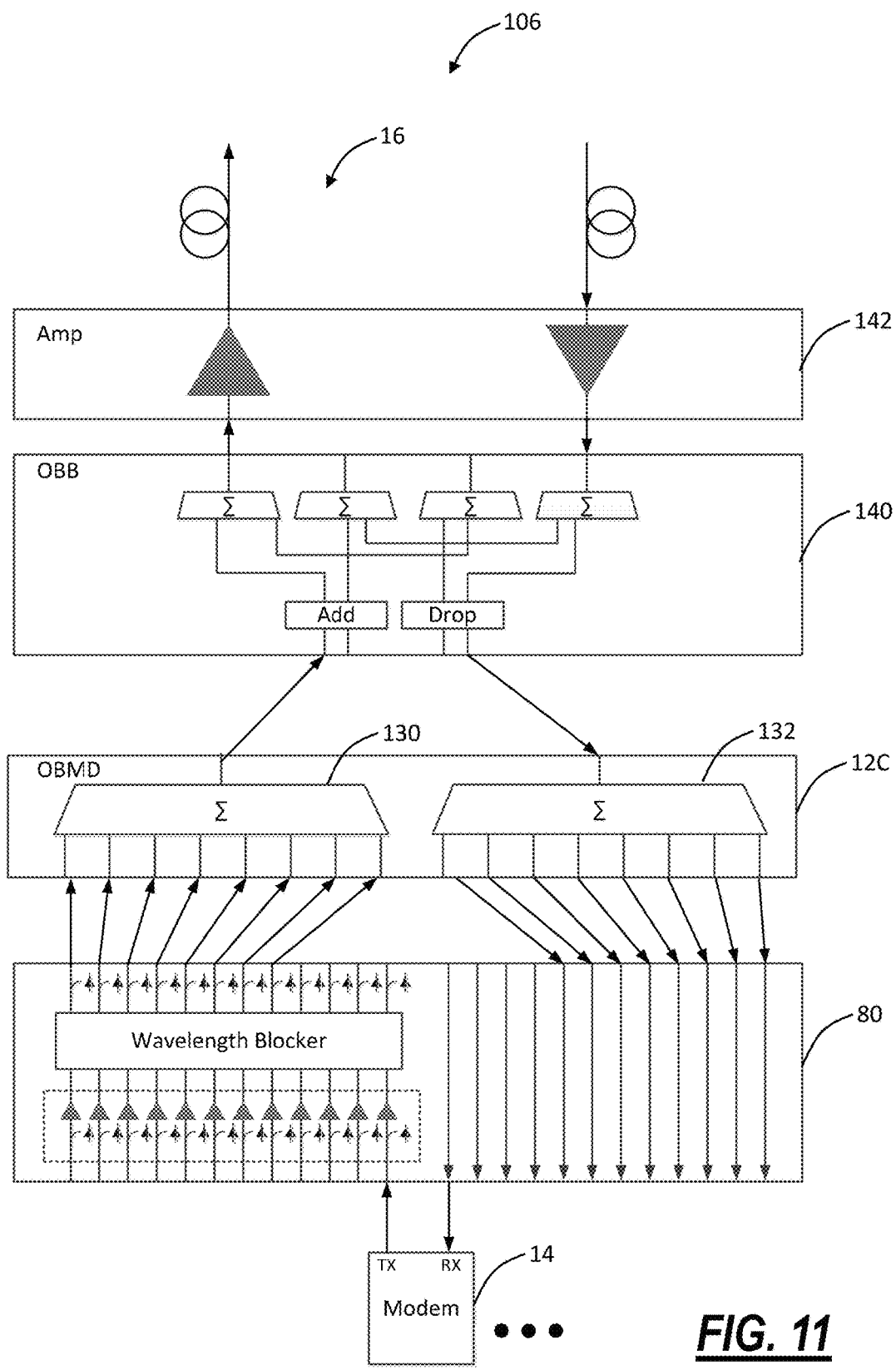
FIG. 11 is a block diagram illustrating the use of the module of FIG. 7 in a broadcast ROADM configuration.

Referring to FIGS. 8-11, in exemplary embodiments, block diagrams illustrate the module 80 used with various ROADM configurations 100, 102, 104, 106. Thus, the module 80 with the filter array 32 and optionally with the amplifier array 34 can be used in various different C (colorless), CD (colorless and directionless), CDC (colorless, directionless, and contentionless), and broadcast architectures. FIG. 8 illustrates the use of the module 80 in a colorless ROADM configuration 100, FIG. 9 illustrates the use of the module 80 in a colorless and directionless ROADM configuration 102, FIG. 10 illustrate the use of the module 80 in a colorless, directionless, and contentionless ROADM configuration 104, and FIG. 11 illustrates the use of the module 80 in a broadcast ROADM configuration 106. Of course, the module 80 can also be used in other architectures, structures, etc.

In FIG. 8, in the colorless ROADM configuration 100, the module 80 is located between the modems 14 and a colorless splitter/combiner 12A for the optical add/drop device 12. The colorless splitter/combiner 12A connects to a line WSS 110 which provides an interface to a direction 16 in the colorless ROADM configuration 100. Again, the module 80 provides noise suppression and/or amplification for the modems 14 to improve performance with colorless optical add/drop devices 12 such as the colorless splitter/combiner 12A. The colorless splitter/combiner 12A includes a combiner 112 on an add side which power combines transmitters from each of the modems 14 and a splitter 114 on a drop side which power splits to receivers for each of the modems 14. Note, the ROADM configuration 100 is not directionless since the connections from the colorless splitter/combiner 12A are fixed to the line WSS 110.

In FIG. 9, in the colorless and directionless ROADM configuration 102, similar to the colorless ROADM configuration 100, the module 80 is located between the modems 14 and a colorless splitter/combiner 12A for the optical add/drop device 12. The colorless and directionless ROADM configuration 102 includes a M×N optical switch 120 between the colorless splitter/combiner 12A and the line WSS 110, enabling directionless functionality where the modems 14 can now be routed to any direction 16 or degree. In FIG. 10, in the colorless, directionless, and contentionless ROADM configuration 104, the optical add/drop device 12 is a multicast switch (MCS) 12B and the module 80 is located between the modems 14 and the MCS 12B. The MCS 12B enables colorless, directionless, and contentionless functionality.

In FIG. 11, in the broadcast ROADM configuration 106, the network architecture provides all wavelengths on all paths in the network with a blocking port used to prevent loops. This configuration is an all broadcast optical layer and is described, for example, in commonly-assigned U.S. Pat. No. 8,554,074 issued Oct. 8, 2013, and entitled "COLORLESS, DIRECTIONLESS, AND GRIDLESS OPTICAL NETWORK, NODE, AND METHOD," the contents of which are incorporated by reference. Specifically, the all broadcast optical layer relies on power combiners and splitters throughout the network, both for the optical add/drop device 12 as well as for the line side multiplexers/demultiplexers. Here, the module 80 is located between the modems 14 and an Optical Broadcast Multiplexer/Demultiplexer (OBMD) 12C for the optical add/drop device 12. The OBMD 12C includes a power combiner 130 on the add side and a power splitter 132 on the drop side. Additionally, the broadcast ROADM configuration 106 includes an Optical Broadcast and Bridge (OBB) 140 connected to each direction 16 with an amplifier 142 as well.

Connection Validation

Figure 12:
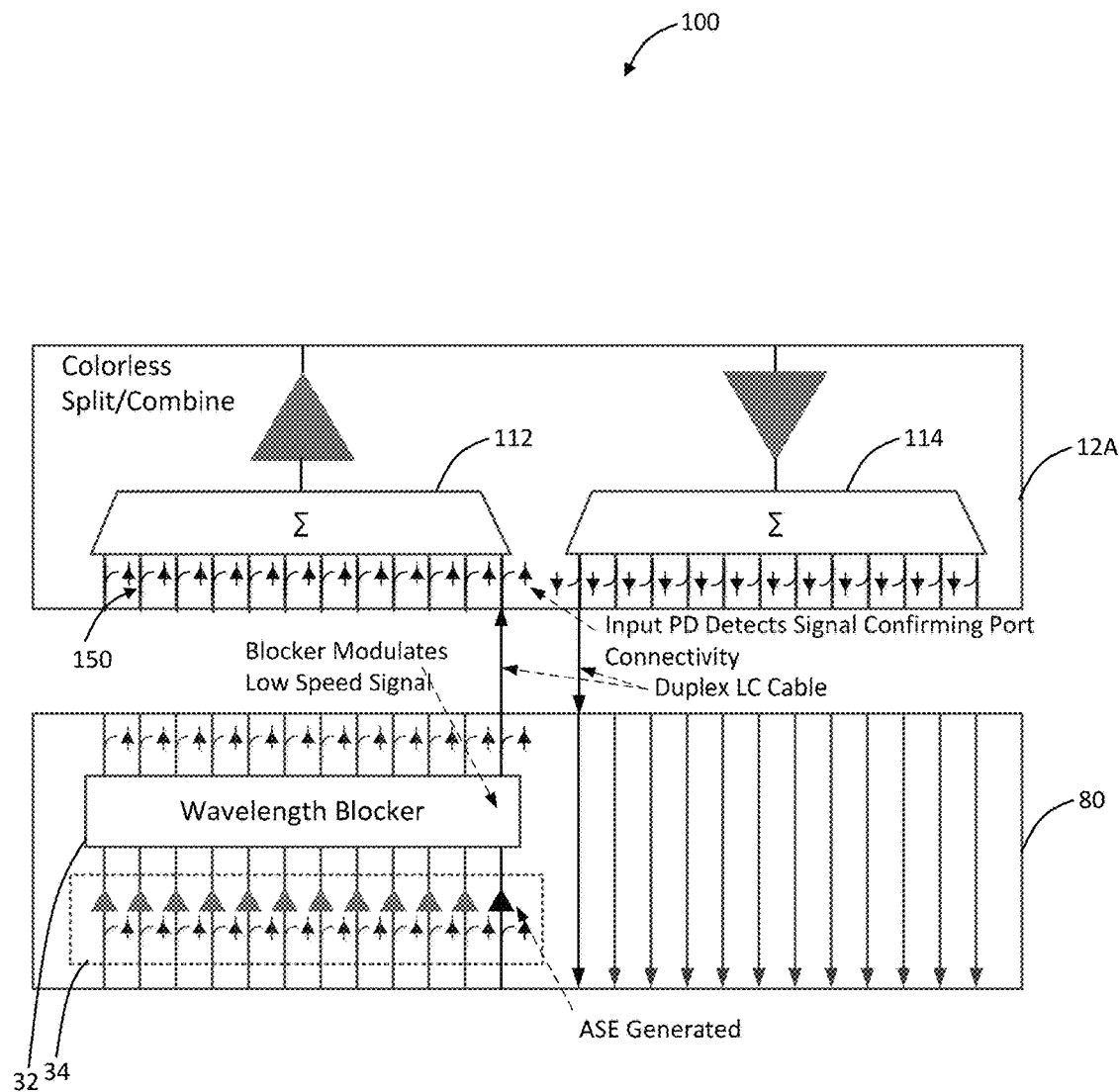
FIG. 12 is a block diagram of the module connected to a colorless splitter/combiner and associated connection validation.
Figure 13:
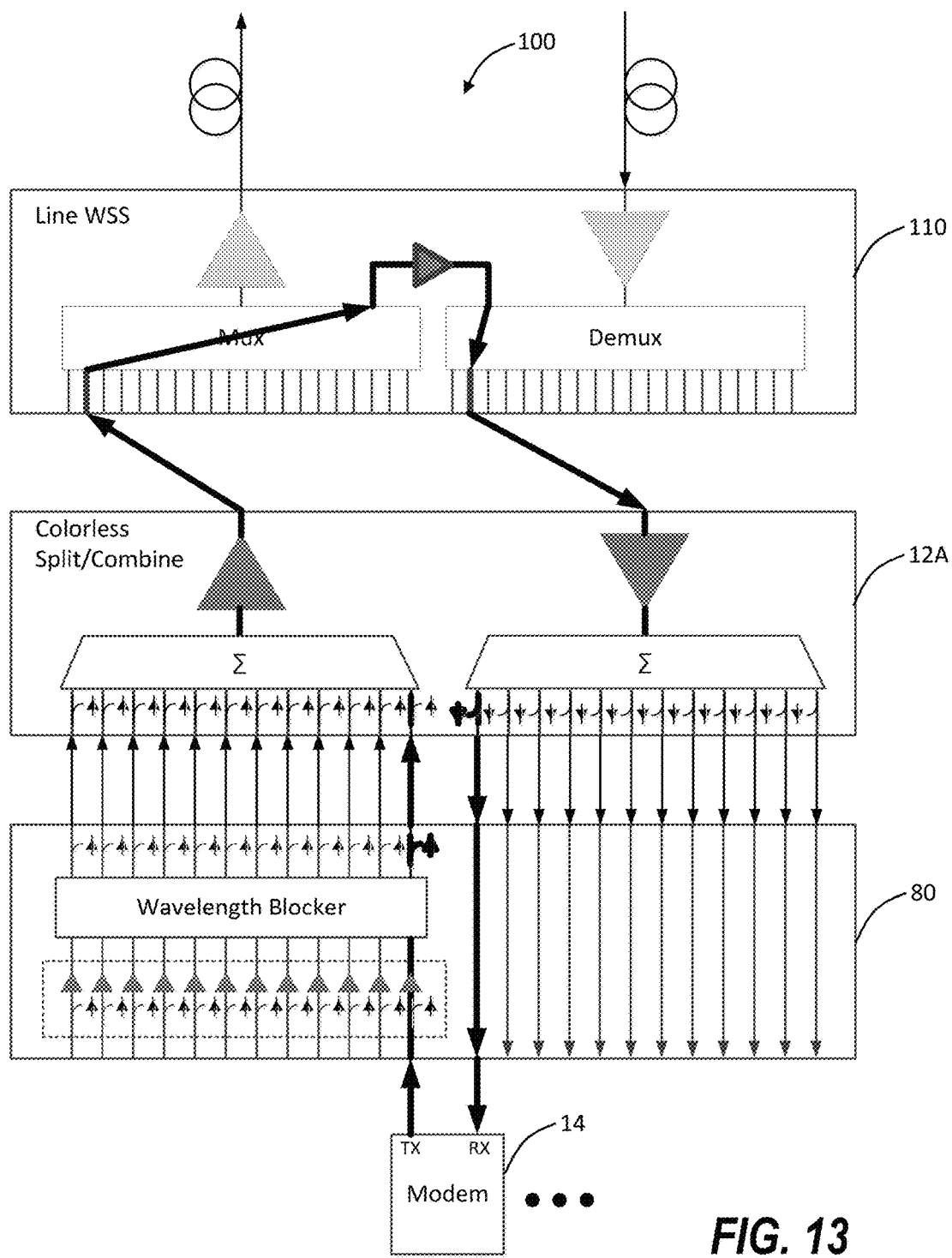
FIG. 13 illustrates the module 80 in the ROADM configuration of FIG. 8 with the colorless splitter/combiner and the line WSS and associated connection validation.

Referring to FIGS. 12 and 13, in an exemplary embodiment, block diagrams illustrate the use of the module 80 in the ROADM configuration 100 for connection validation. Specifically, FIG. 12 illustrates the module 80 connected to the colorless splitter/combiner 12A and associated connection validation. FIG. 13 illustrates the module 80 in the ROADM configuration 100 with the colorless splitter/combiner 12A and the line WSS 110 and associated connection validation. Connection validation enables cable tracing to determine which ports connect to one another, fiber insertion loss measurement, and transponder/modem loopbacks. In FIG. 12, for a cable trace, the connections between the module 80 to the colorless splitter/combiner 12A could be duplex LC based. The filter array 32 can be used to send a primitive signal to the colorless splitter/combiner 12A by "winking" that confirms a cable connects the correct two ports. For example, the filter array 32 can module a low-speed signal that is detected by detectors 150 on the colorless splitter/combiner 12A to confirm port connectivity.

For fiber insertion loss measurements, the amplifier array 34 can use channel amplifier ASE to measure the insertion loss between the module 80 and the colorless splitter/combiner 12A. Bidirectional insertion loss can be measured as part of the transponder loopback activity. Specifically, in FIG. 13, for transponder loopback, the line WSS 110 can support a loopback feature to loop a modem 14 back on itself, i.e., TX to RX, through the module 80, the colorless splitter/combiner 12A, and the line WSS 110.

Autonomous Channel Provisioning

Figure 14:
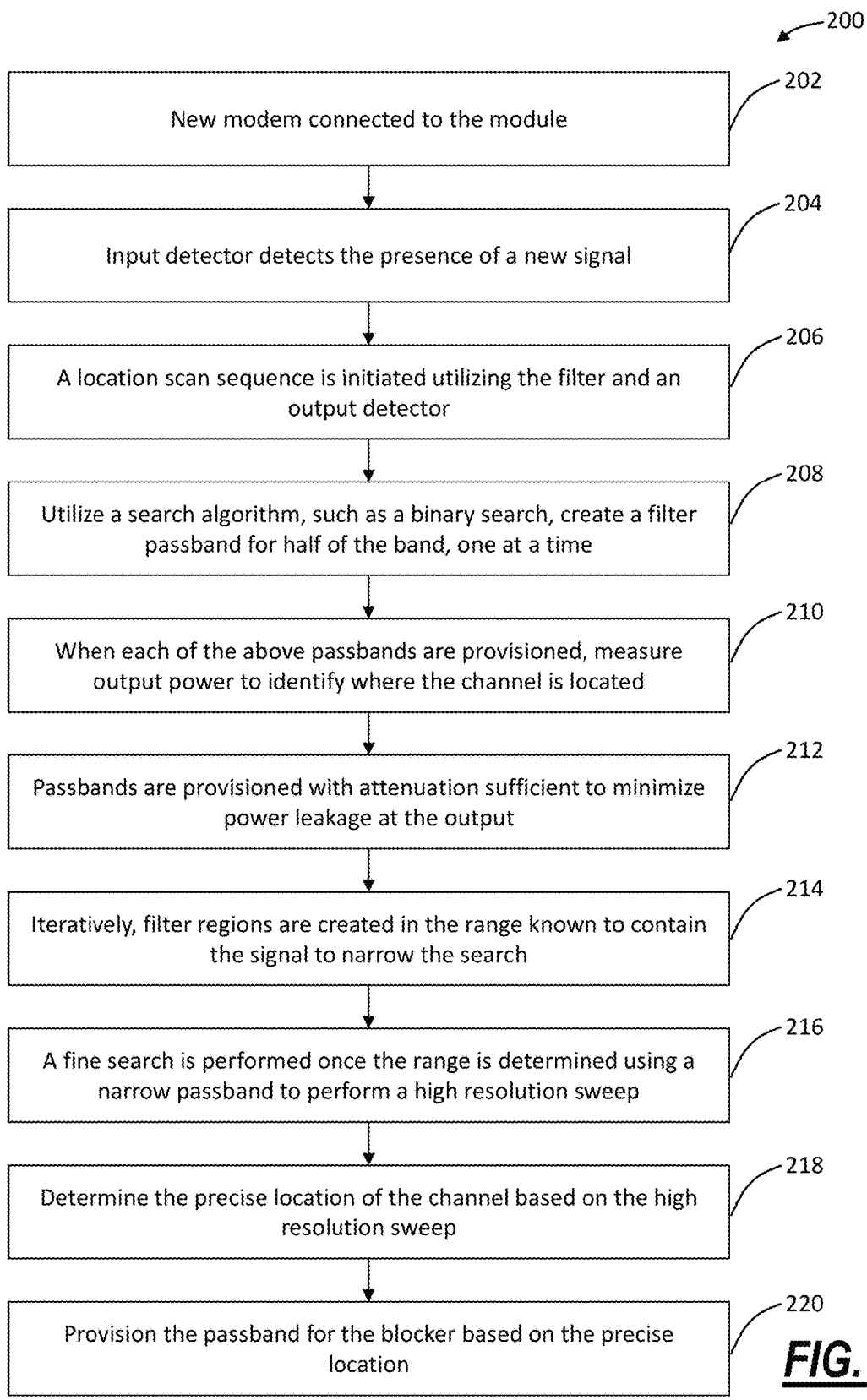
FIG. 14 is a flowchart of an autonomous channel provisioning process for detecting a new signal and automatically provisioning the wavelength blocking filter.
Figure 15:
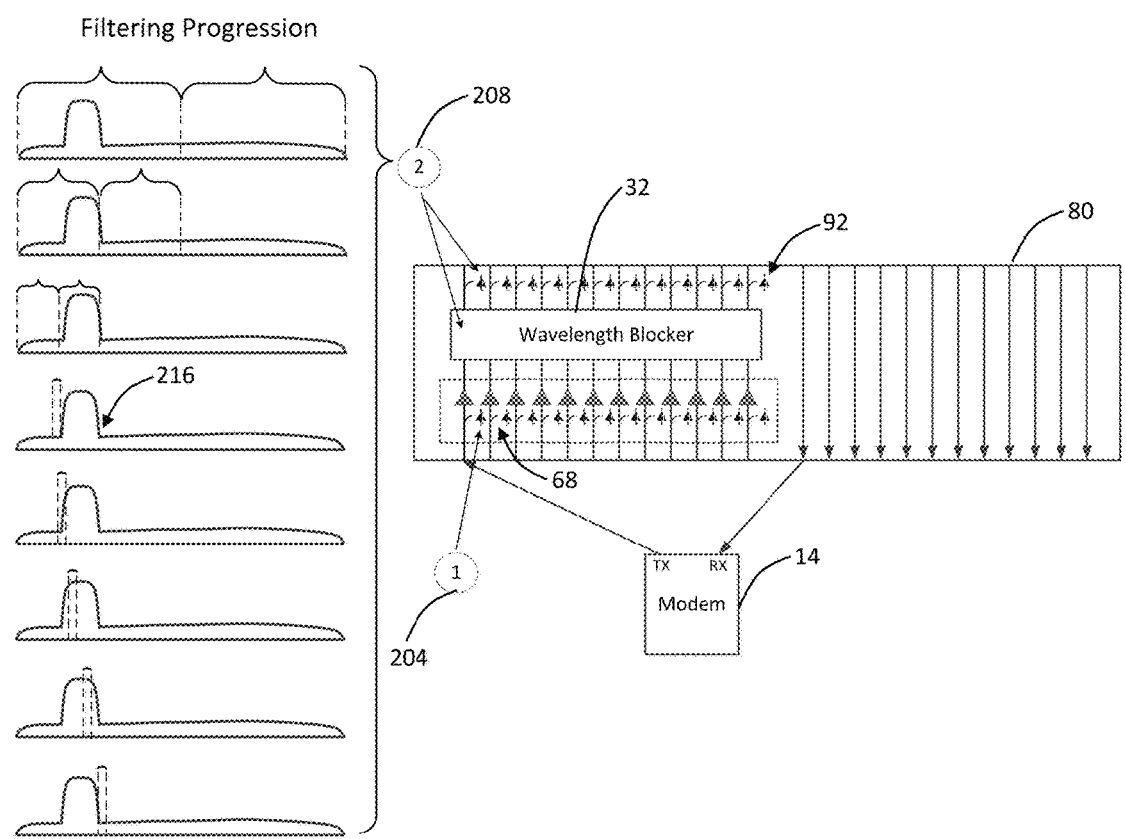
FIG. 15 is graphs and a block diagram of an exemplary operation of the autonomous channel provisioning process of FIG. 14.

Referring to FIGS. 14 and 15, in an exemplary embodiment, a flowchart, graphs, and a block diagram illustrate an autonomous channel provisioning process 200 and exemplary operation with the module 80. Specifically, the autonomous channel provisioning process 200 allows the 1×1 wavelength blocking filter 40 in the filter array 32 in the module 80 to provision automatically the passband 50 responsive to detection of a specific optical signal 52. That is, the module 80 can automatically detect and provision the passband 50, without user provisioning. This is advantageous to provide a flexible passband 50 as well as to support an open line system, accepting modems, transponders, etc. from third party non-integrated devices. Often a central controller will manage the provisioning required to add new channels, transponders, modems, etc. to a system. In contrast, the autonomous channel provisioning process 200 allows for autonomous provisioning, without guidance from a shelf/node processor, the module 80 can independently determine a channel's frequency and optical bandwidth in order to provision the 1×1 wavelength blocking filter 40. A key enabler is the fact that the ASE 36 is easily differentiated from the optical signal 52 in terms of power, i.e., power in the optical signal 52 is much greater than power in the ASE 36.

With reference to both FIGS. 14 and 15, the autonomous channel provisioning process 200 can be initiated when a new modem is connected to an input port of the module (step 202), i.e., the modem 14 is coupled to the module 80. The input detector 68 detects the presence of the new signal from the modem 14 (step 204). A location scan sequence is initiated utilizing the filter (e.g., the LCOS 42) and the output detector 92 (step 206). A search algorithm is utilized, such as a binary search or other techniques, to create a filter passband to check for the presence of the optical signal 52, e.g., creating a filter passband for half of the band, one at a time (step 208). Of course, other search techniques are contemplated, and the binary search is presented for illustration purposes.

For the binary search, when each of the passbands is provisioned, the output power is measured to identify where the optical signal 52 is located (step 210). The passbands are provisioned with attenuation sufficient to minimize power leakage at the output of the module 80 (step 212). Iteratively, filter regions are created in the range known to contain the signal to narrow further the search (step 214). Once the range is determined, a fine search is performed using a narrow passband to perform a high-resolution sweep (step 216). For example, the narrow passband can be 6.25 GHz or whatever is the bandwidth resolution limit of the LCOS 42. The high-resolution sweep determines the precise location of the optical signal 52 (channel) (step 218). Finally, the passband 50 for the 1×1 wavelength blocking filter 40 is provisioned based on the precise location determined in the foregoing steps (step 220).

Comparison of Noise Funneling Mitigation Options

Figure 16:
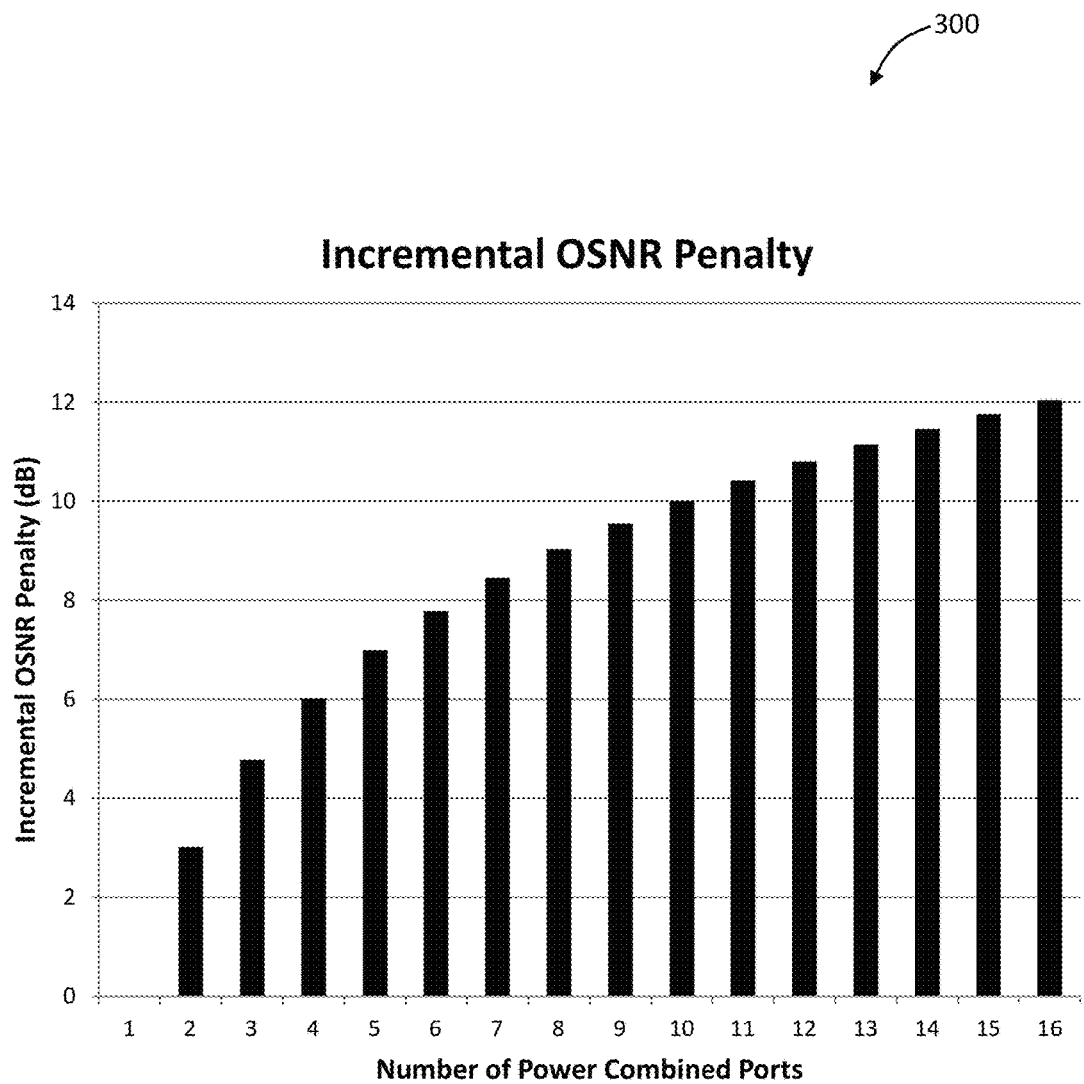
FIG. 16 is a graph of the incremental OSNR penalty for additional power combined ports.

Referring to FIG. 16, in an exemplary embodiment, a graph illustrates the incremental OSNR penalty 300 for additional power combined ports. Note, having up to 16 power combined ports can lead to an OSNR penalty in excess of 12 dB, again which could be below the operating margin prior to launch. The noise suppression in a colorless optical add/drop system described herein flattens the incremental OSNR penalty curve such that incremental channels add little to no additional noise over the first channel.

Process for Noise Suppression

Figure 17:
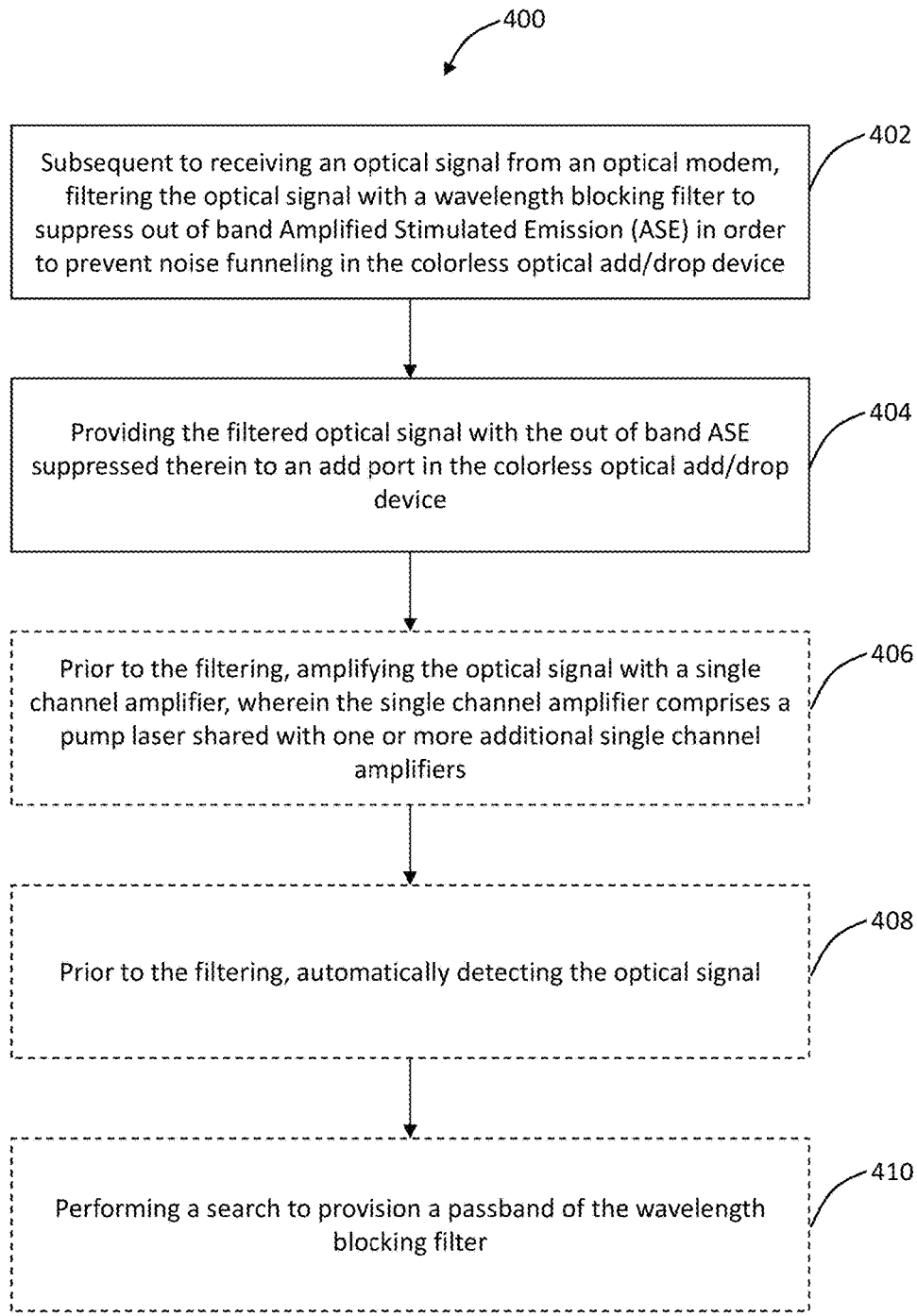
FIG. 17 is a flowchart of a process for noise suppression in a colorless optical add/drop system implemented prior to a colorless optical add/drop device.

Referring to FIG. 17, in an exemplary embodiment, a flowchart illustrates a process 400 for noise suppression in a colorless optical add/drop system implemented prior to a colorless optical add/drop device. The process 400 includes, subsequent to receiving an optical signal from an optical modem, filtering the optical signal with a wavelength blocking filter to suppress out of band Amplified Stimulated Emission (ASE) in order to prevent noise funneling in the colorless optical add/drop device (step 402); and providing the filtered optical signal with the out of band ASE suppressed therein to an add port in the colorless optical add/drop device (step 404). The wavelength blocking filter can be in a filter array disposed in a module, wherein the module can be separate from the optical modem and the colorless optical add/drop device and connected to each via one or more fiber connections, and wherein the filter array can include a plurality of wavelength blocking filters.

The process 400 can include, prior to the filtering, amplifying the optical signal with a single channel amplifier, wherein the single channel amplifier can include a pump laser shared with one or more additional single channel amplifiers (step 406). The wavelength blocking filter can be in a filter array disposed in a module, and the single channel amplifier can be in an amplifier array in the housing, wherein the module can be separate from the optical modem and the colorless optical add/drop device and connected to each via one or more fiber connections, and wherein the filter array can include a plurality of wavelength blocking filters, and the amplifier array can include the single channel amplifier and the one or more additional single channel amplifiers. The wavelength blocking filter can include a flexible bandwidth Liquid Crystal on Silicon (LCOS) filter. The process 400 can further include, prior to the filtering, automatically detecting the optical signal (step 408); and performing a search to provision a passband of the wavelength blocking filter (step 410). The optical signal can utilize a modulation format supporting 200 Gb/s or more. The optical modem can include a pluggable optical module. The colorless optical add/drop device can utilize power combiners on an add side.

In another exemplary embodiment, an apparatus for noise suppression in a colorless optical add/drop system, wherein the apparatus is located prior to a colorless optical add/drop device, includes a housing (module 80) including one or more input ports 82, 88 and one or more output ports 84, 86; and a filter array 32 including one or more wavelength blocking filters 40 each adapted to receive an optical signal from an optical modem 14 connected to an input port 82, to filter the optical signal to suppress out of band Amplified Stimulated Emission (ASE) in order to prevent noise funneling in the colorless optical add/drop device 12, and to provide the filtered optical signal with the out of band ASE suppressed therein to an add port in the colorless optical add/drop device 12 via an output port 86. The housing is separate from the optical modem 14 and the colorless optical add/drop device 12 and connected to each via one or more fiber connections, and wherein the filter array 32 includes a plurality of wavelength blocking filters 40.

The apparatus can further include an amplifier array 34 including one or more single channel amplifiers 66 each adapted to amplify the optical signal, wherein the one or more single channel amplifiers 66 include a pump laser 64 shared between one another and wherein the amplifier array 34 is located between the filter array 32 and the one or more input ports 82. The one or more wavelength blocking filters 40 each can include a flexible bandwidth Liquid Crystal on Silicon (LCOS) 42 filter. The apparatus can further include circuitry adapted to automatically detect the optical signal 52, prior to the filter array 32; and circuitry adapted to perform a search to provision a passband 50 of an associated wavelength blocking filter 40. The optical signal 52 can utilize a modulation format supporting 200 Gb/s or more. The optical modem 14 can include a pluggable optical module. The colorless optical add/drop device 12 can utilize power combiners on an add side.

In a further exemplary embodiment, a colorless Reconfigurable Optical Add/Drop Multiplexer (ROADM) node 10 with noise suppression prior to a colorless optical add/drop device 12 includes one or more optical add/drop devices 12 optically coupled to wavelength selective components 20 at one or more directions 16; one or more optical modems 14; and a noise suppression module 80 including a filter array 32 including one or more wavelength blocking filters 40 each adapted to receive an optical signal from an optical modem 14 connected to an input port, to filter the optical signal to suppress out of band Amplified Stimulated Emission (ASE) in order to prevent noise funneling in a colorless optical add/drop device 12, and to provide the filtered optical signal with the out of band ASE suppressed therein to an add port in the colorless optical add/drop device 12 via an output port. The noise suppression module 80 can further include an amplifier array 34 including one or more single channel amplifiers 66 each adapted to amplify the optical signal, wherein the one or more single channel amplifiers 66 can include a pump laser 64 shared between one another and wherein the amplifier array 34 is located between the filter array 32 and the one or more input ports. The one or more wavelength blocking filters 40 can each include a flexible bandwidth Liquid Crystal on Silicon (LCOS) 42 filter.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for noise suppression in a colorless optical add/drop system implemented prior to a colorless optical add/drop device, the method comprising:
receiving an optical signal from an optical modem based on detection via a first detector located prior to a wavelength blocking filter, and performing an iterative search across all optical spectrum to provision a passband of the wavelength blocking filter based on detection of the optical signal by a second detector located subsequent to the wavelength blocking filter, wherein the optical signal is on a flexible grid on the optical spectrum;
filtering the optical signal with the wavelength blocking filter to suppress out of band Amplified Stimulated Emission (ASE) in order to prevent noise funneling in the colorless optical add/drop device, wherein the colorless optical add/drop device comprises a power combiner on an add side which combines out of band ASE from all inputs; and
providing the filtered optical signal with the out of band ASE suppressed therein to an add port in the colorless optical add/drop device.

2. The method of claim 1, wherein the wavelength blocking filter is in a filter array disposed in a module, wherein the module is separate from the optical modem and the colorless optical add/drop device and connected to each via one or more fiber connections, and wherein the filter array comprises a plurality of wavelength blocking filters.

3. The method of claim 1, further comprising:
prior to the filtering, amplifying the optical signal with a single channel amplifier, wherein the single channel amplifier comprises a pump laser shared with one or more additional single channel amplifiers.

4. The method of claim 3, wherein the wavelength blocking filter is in a filter array disposed in a module and the single channel amplifier is in an amplifier array in a housing, wherein the module is separate from the optical modem and the colorless optical add/drop device and connected to each via one or more fiber connections, and wherein the filter array comprises a plurality of wavelength blocking filters and the amplifier array comprises the single channel amplifier and the one or more additional single channel amplifiers.

5. The method of claim 1, wherein the wavelength blocking filter comprises one of a flexible bandwidth Liquid Crystal on Silicon (LCOS) filter, Liquid Crystal (LC) filter, and a Digital Light Processing (DLP) filter.

6. The method of claim 1, further comprising:
equalizing the optical signal with a plurality of optical signals associated with the colorless optical add/drop device based on detection by the second detector, with the wavelength blocking filter.

7. The method of claim 1, wherein the optical signal utilizes a modulation format supporting 200 Gb/s or more.

8. The method of claim 1, wherein the optical modem comprises a pluggable optical module.

9. The method of claim 1, wherein the wavelength blocking filter is configured to adjust the filtering based on an adjustable baud rate of the optical modem.

10. An apparatus for noise suppression in a colorless optical add/drop system, wherein the apparatus is located prior to a colorless optical add/drop device, the apparatus comprising:
a housing comprising one or more input ports and one or more output ports;
a filter array comprising one or more wavelength blocking filters each adapted to receive an optical signal from an optical modem connected to an input port based on detection via a first detector located prior to an associated wavelength blocking filter, to filter the optical signal to suppress out of band Amplified Stimulated Emission (ASE) in order to prevent noise funneling in the colorless optical add/drop device, and to provide the filtered optical signal with the out of band ASE suppressed therein to an add port in the colorless optical add/drop device via an output port, wherein the colorless optical add/drop device comprises a power combiner on an add side which combines out of band ASE from all inputs; and circuitry adapted to perform an iterative search across all optical spectrum to provision a passband of an associated wavelength blocking filter based on detection of the optical signal by an associated second detector located subsequent to the associated wavelength blocking filter, wherein the optical signal is on a flexible grid on the optical spectrum.

11. The apparatus of claim 10, wherein the housing is separate from the optical modem and the colorless optical add/drop device and connected to each via one or more fiber connections, and wherein the filter array comprises a plurality of wavelength blocking filters.

12. The apparatus of claim 10, further comprising:
an amplifier array comprising one or more single channel amplifiers each adapted to amplify the optical signal, wherein the one or more single channel amplifiers comprise a pump laser shared between one another and wherein the amplifier array is located between the filter array and the one or more input ports.

13. The apparatus of claim 10, wherein the one or more wavelength blocking filters each comprise one of a flexible bandwidth Liquid Crystal on Silicon (LCOS) filter, Liquid Crystal (LC) filter, and a Digital Light Processing (DLP) filter.

14. The apparatus of claim 11, further comprising:
circuitry adapted to cause equalization of the optical signal with a plurality of optical signals associated with the colorless optical add/drop device based on detection by the second detector, with the wavelength blocking filter.

15. The apparatus of claim 10, wherein the optical modem comprises a pluggable optical module.

16. The apparatus of claim 10, wherein the one or more wavelength blocking filters are configured to adjust the filter based on an adjustable baud rate of the associated optical modem.

17. A colorless Reconfigurable Optical Add/Drop Multiplexer (ROADM) node with noise suppression prior to a colorless optical add/drop device, the colorless ROADM node comprising:
one or more colorless optical add/drop devices optically coupled to wavelength selective components at one or more directions;
one or more optical modems; and
a noise suppression module comprising a filter array comprising one or more wavelength blocking filters each adapted to receive an optical signal from an optical modem connected to an input port modem based on detection via a first detector located prior to an associated wavelength blocking filter, to filter the optical signal to suppress out of band Amplified Stimulated Emission (ASE) in order to prevent noise funneling in the one or more colorless optical add/drop devices, and to provide the filtered optical signal with the out of band ASE suppressed therein to an add port in the one or more colorless optical add/drop devices via an output port, wherein the one or more colorless optical add/drop devices each comprise a power combiner on an add side which combines out of band ASE from all inputs,
wherein the noise suppression module comprises circuitry adapted to perform an iterative search across all optical spectrum to provision a passband of an associated wavelength blocking filter based on detection of the optical signal by a second detector located subsequent to the associated wavelength blocking filter, wherein the optical signal is on a flexible grid on the optical spectrum.

18. The colorless ROADM node of claim 17, wherein the noise suppression module further comprises:
an amplifier array comprising one or more single channel amplifiers each adapted to amplify the optical signal, wherein the one or more single channel amplifiers comprise a pump laser shared between one another and wherein the amplifier array is located between the filter array and the one or more input ports.

* * * * *